US012757021B2

(12) United States Patent
Rappard et al.

(10) Patent No.: US 12,757,021 B2
(45) Date of Patent: Oct. 6, 2026

(54) MOBILE NETWORK INFORMATION SHARING VIA EBPF FOR ZERO TRUST SECURITY

(71) Applicant: Palo Alto Networks, Inc., Santa Clara, CA (US)

(72) Inventors: Mitchell Rappard, Lee's Summit, MO (US); Keith Edmund O'Brien, Metuchen, NJ (US); John Edward McDowall, Redwood City, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 218 days.

(21) Appl. No.: 18/213,698

(22) Filed: Jun. 23, 2023

(65) Prior Publication Data

US 2024/0430680 A1 Dec. 26, 2024

(51) Int. Cl.

*H04W 12/088* (2021.01)
*H04L 9/40* (2022.01)
*H04W 12/72* (2021.01)

(52) U.S. Cl.

CPC ....... *H04W 12/088* (2021.01); *H04L 63/1425* (2013.01); *H04L 63/20* (2013.01); *H04W 12/72* (2021.01)

(58) Field of Classification Search

CPC ... H04W 12/088; H04W 12/08; H04W 12/72; H04W 24/08; H04W 12/121;

(Continued)

(56) References Cited

U.S. PATENT DOCUMENTS 10,708,306 B2 * 7/2020 Verma ................. H04L 63/1408
10,834,136 B2 * 11/2020 Verma ................... H04L 63/029

(Continued)

FOREIGN PATENT DOCUMENTS

CN 116506189 A * 7/2023
GB 2478704 A * 9/2011 ............ H04L 29/06
WO WO-2023247819 A1 * 12/2023

OTHER PUBLICATIONS

German Peinado Gomez etc., "Security policies definition and enforcement utilizing policy control function framework in 5G", Computer Communications, vol. 172, pp. 226-237 (Year: 2021).*

(Continued)

*Primary Examiner* — Zhimei Zhu
(74) *Attorney, Agent, or Firm* — Van Pelt, Yi & James LLP

(57) ABSTRACT

Techniques for mobile network information sharing via extended Berkeley Packet Filter (eBPF) for zero trust security are disclosed. In some embodiments, a system/process/computer program product for mobile network information sharing via eBPF for zero trust security includes monitoring network traffic in a core mobile network using an agent executed on a network element in the core mobile network to identify a session associated with a User Equipment (UE) that attached to the core mobile network for mobile network communications; extracting meta information associated with the session using the agent executed on a network element in the core mobile network; sending the extracted meta information to a security platform located outside of the core mobile network; and enforcing a security policy on the session at the security platform based on the extracted meta information to apply granular-based security in the core mobile network based on a security policy.

17 Claims, 8 Drawing Sheets

(58) Field of Classification Search

CPC . H04W 12/122; H04W 12/128; H04W 76/11; H04W 8/18; H04W 80/04; H04L 63/0236; H04L 63/20; H04L 63/0245; H04L 63/0254; H04L 63/0227; H04L 63/10

See application file for complete search history.

(56) References Cited

U.S. PATENT DOCUMENTS

| | | | | |
|---|---|---|---|---|
| 11,317,292 | B1 * | 4/2022 | Feldmann | H04W 12/08 |
| 12,328,625 | B2 * | 6/2025 | Verma | H04W 12/60 |
| 12,375,922 | B2 * | 7/2025 | Verma | H04L 63/20 |
| 2018/0367570 | A1 * | 12/2018 | Verma | H04W 12/48 |
| 2018/0367571 | A1 * | 12/2018 | Verma | H04L 63/029 |
| 2018/0367574 | A1 * | 12/2018 | Verma | H04L 63/20 |
| 2019/0141081 | A1 * | 5/2019 | Kunz | H04W 8/04 |
| 2020/0259870 | A1 * | 8/2020 | Verma | H04W 12/088 |
| 2021/0243232 | A1 * | 8/2021 | Verma | H04L 63/205 |
| 2022/0247792 | A1 * | 8/2022 | Verma | H04L 63/205 |
| 2022/0408255 | A1 * | 12/2022 | Howe | H04W 12/062 |
| 2023/0054005 | A1 * | 2/2023 | Verma | H04L 63/20 |
| 2023/0300104 | A1 * | 9/2023 | Thiebaut | H04L 61/2571<br>709/206 |
| 2024/0073698 | A1 * | 2/2024 | Verma | H04L 63/1408 |
| 2024/0259428 | A1 * | 8/2024 | Verma | H04L 61/4588 |
| 2025/0260722 | A1 * | 8/2025 | Rappard | H04L 61/503 |

OTHER PUBLICATIONS

German Peinado Gomez, Jordi Mongay Batalla, Yoan Miche, Silke Holtmanns, Constandinos X. Mavromoustakis, George Mastorakis, Noman Haider, Security policies definition and enforcement utilizing policy control function framework in 5G, Computer Communications, vol. 172, pp. 226-237 (Year: 2021).*

Aya, GitHub, 3 pages, downloaded Jun. 23, 2023, https://github.com/aya-rs/aya.

Azizi, Debugging with eBPF Part 3: Tracing SSL/TLS connections, Sep. 16, 2021, Pixie blog, 16 pages, https://blog.px.dev/ebpf-openssl-tracing/.

EBPF Summit 2023, Dynamically program the kernel for efficient networking, observability, tracking, and security, downloaded Jun. 23, 2023, 6 pages, https://ebpf.io.

ETSI TS 129 060, Digital cellular telecommunications system (Phase 2+); Universal Mobile Telecommunications System (UMTS); General Packet Radio Service (GPRS); GPRS Tunnelling Protocol (GTP) across the Gn and Gp interface (3GPP TS 29.060 version 12.6.0 Release 12), 2014, 185 pages.

Maurico Vasquez Bernal, BPF Features by Linux Kernel Version, JIT compiling, downloaded Jun. 23, 2023, 20 pages, https://github.com/iovisor/bcc/blob/master/docs/kernel-versions.md.

Microsoft / ebpf-for-windows, eBPF implementation that runs on top of Windows, 4 pages, downloaded Jun. 23, 2023, https://github.com/microsoft/ebpf-for-windows.

Navarro Do Amaral et al., Run-Time Adaptive In-Kernel BPF/XDP Solution for 5G UPF, School of Electrical and Computer Engineering (FEEC), 2022, 19 pages, https://doi.org/10.3390/electronics11071022.

Navarrothiago / upf-bpf, An In-Kernel Solution Based on BPF/XDP for 5G UPF, 17 pages, downloaded Jun. 23, 2023, https://github.com/navarrothiago/upf-bpf.

PFCP(Packet Forwarding Control Protocol) implementation in Golang, 16 pages, downloaded Jun. 23, 2023, https://github.com/wmnsk/go-pfcp.

* cited by examiner

| TYPE | FROM ZONE | TO ZONE | SOURCE | SOURCE USER | DESTINATION | TO PORT | APPLICATION | ACTION |
|---|---|---|---|---|---|---|---|---|
| Start | trust | untrust | 10.45.0.2 | Imsi-901700000000003 | 142.250.189.164 | 80 | google-base | allow |
| Start | trust | untrust | 10.45.0.2 | Imsi-901700000000003 | 142.250.189.164 | 80 | web-browsing | allow |

FIG. 2B

| CATEGORY | URL CATEGORY LIST | URL | FROM ZONE | TO ZONE | SOURCE | SOURCE USER | DESTINATION | APPLICATION | ACTION |
|---|---|---|---|---|---|---|---|---|---|
| Command-and-control | Command-and-control | mioshaltikaz.com/ | trust | untrust | 10.45.0.2 | imsi-901700000000003 | 137.184.238.172 | web-browsing | block-url |

FIG. 2C

| NAME | TAGS | TYPE | Source | | Destination | | APPLICATION | SERVICE | ACTION |
|---|---|---|---|---|---|---|---|---|---|
| | | | ZONE | USER | ZONE | ADDRESS | | | |
| secure traffic for certain subscribers | ***** | ******* | trust | imsi-901700000000003 | *** | *** | ******* | application | Allow |

FIG. 2D

MOBILE NETWORK INFORMATION SHARING VIA EBPF FOR ZERO TRUST SECURITY

BACKGROUND OF THE INVENTION

A firewall generally protects networks from unauthorized access while permitting authorized communications to pass through the firewall. A firewall is typically a device or a set of devices, or software executed on a device, such as a computer, which provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

FIG. 2B illustrates an example of a traffic log showing the extracted user's IMSI in the User-ID field in accordance with some embodiments.

FIG. 2C illustrates an example of a threat/URL log in accordance with some embodiments.

FIG. 2D illustrates an example of a security policy in accordance with some embodiments.

DETAILED DESCRIPTION

Figure 1:
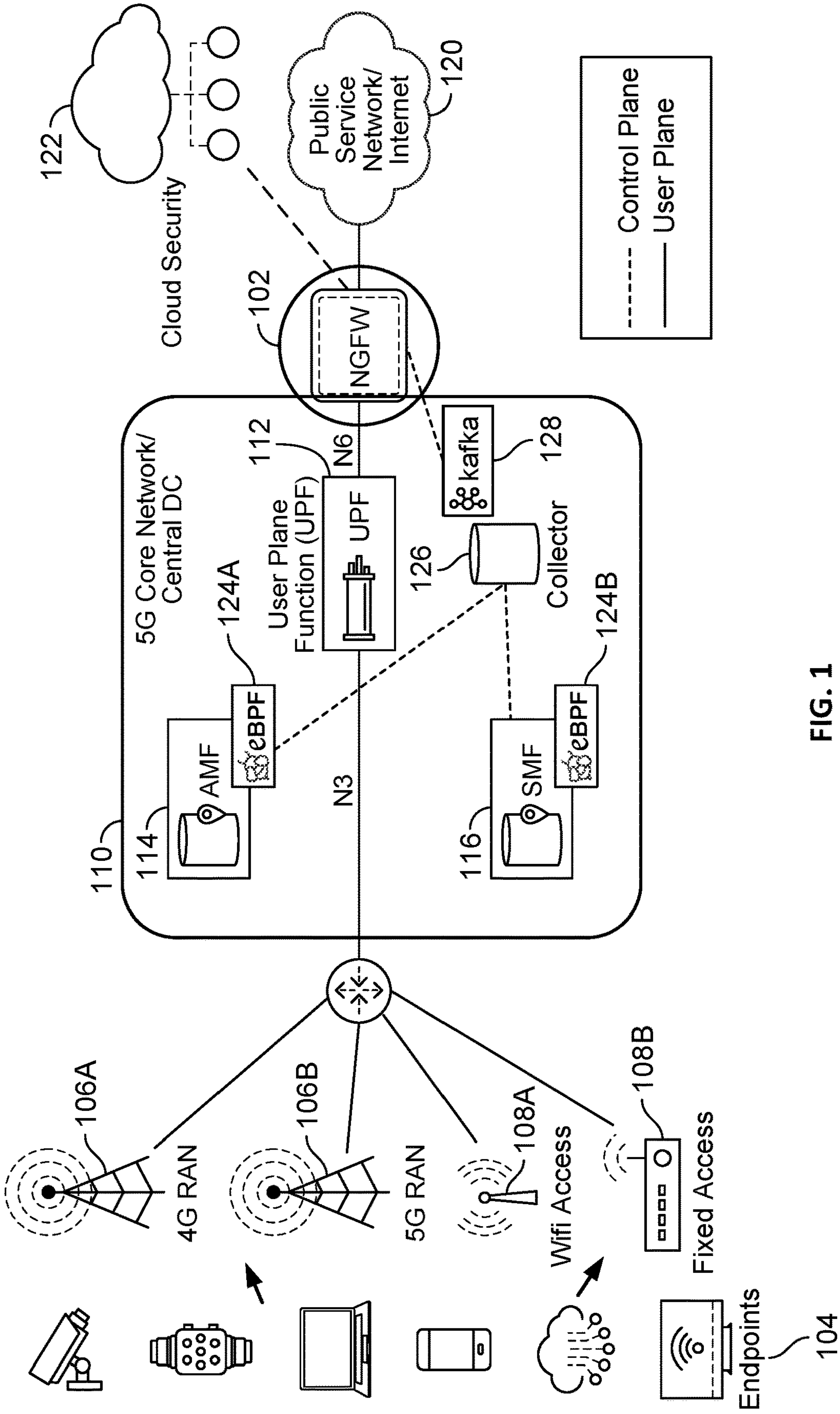
FIG. 1 is a block diagram of an architecture of a 5G wireless network with a security platform for providing mobile network information sharing via extended Berkeley Packet Filter (eBPF) for zero trust security in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall/security rules or firewall/security policies, which can be triggered based on various criteria, such as described herein). A firewall may also apply anti-virus protection, malware detection/prevention, or intrusion protection by applying a set of rules or policies.

Security devices (e.g., security appliances, security gateways, security services, and/or other security devices) can include various security functions (e.g., firewall, anti-malware, intrusion prevention/detection, proxy, and/or other security functions), networking functions (e.g., routing, Quality of Service (QOS), workload balancing of network related resources, and/or other networking functions), and/or other functions. For example, routing functions can be based on source information (e.g., source IP address and port), destination information (e.g., destination IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., using application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content. In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series next generation firewalls, Palo Alto Networks' VM Series virtualized next generation firewalls, and CN Series container next generation firewalls).

For example, Palo Alto Networks' next generation firewalls enable enterprises and service providers to identify and control applications, users, and content—not just ports, IP addresses, and packets-using various identification technologies, such as the following: App-ID™ (e.g., App ID) for accurate application identification, User-ID™ (e.g., User ID) for user identification (e.g., by user or user group), and Content-ID™ (e.g., Content ID) for real-time content scanning (e.g., controls web surfing and limits data and file transfers). These identification technologies allow enterprises to securely enable application usage using business-relevant concepts, instead of following the traditional approach offered by traditional port-blocking firewalls. Also, special purpose hardware for next generation firewalls implemented, for example, as dedicated appliances generally provides higher performance levels for application inspection than software executed on general purpose hardware (e.g., such as security appliances provided by Palo Alto Networks, Inc., which utilize dedicated, function specific processing that is tightly integrated with a single-pass software engine to maximize network throughput while minimizing latency for Palo Alto Networks' PA Series next generation firewalls).

Overview of Techniques for Mobile Network Information Sharing Via EBPF for Zero Trust Security Technical and security challenges with service provider networks exist for devices in mobile networks (e.g., 4G/LTE and 5G mobile networks). For example, some 4G/LTE and 5G networks (e.g., including private and public cloud-based 4G/LTE and 5G networks) do not expose 3GPP interfaces between network functions, which prevents deployment of security solutions (e.g., firewalls, such as NGFWs) on these interfaces to apply context-based security to network traffic on such 4G/LTE and 5G networks. Specifically, some mobile service providers are reluctant to deploy such security solutions on 3GPP interfaces due to concerns over potential latency impacts and service outages.

Specifically, in mobile networks, such as 5G service provider mobile networks or other 5G mobile networks, a portion of the communications over these mobile networks is often encrypted or on interfaces that are not open for inspection (e.g., security inspection using a security platform, such as an NGFW or another implementation of a security platform, such as a security sensor, for performing security inspection on mobile network traffic). Even if a security platform can access/decrypt such mobile network traffic and/or interfaces for security inspection on such a mobile network, it is often not an option to have a security platform located within, for example, the service provider mobile network to perform such security inspection. As a result, enforcement of granular security is inhibited as the security platform does not have access to key meta data associated with the mobile network traffic (e.g., meta data for sessions to facilitate granular security policy enforcement can include subscriber ID (e.g., International Mobile Subscriber Identity (IMSI) in a 4G mobile network and/or using Subscription Permanent Identifier (SUPI) in a 5G mobile network), equipment ID (e.g., International Mobile Equipment Identity (IMEI) in a 4G mobile network and/or using Permanent Equipment Identifier (PEI) in a 5G mobile network), network slice, and/or other meta data associated with the mobile network traffic), which also renders zero trust security difficult if not impossible for such mobile network environments.

As such, what are needed are new and improved security techniques for devices communicating on such service provider mobile network environments (e.g., mobile networks, including various 4G/LTE, 5G (and later) mobile networks). Specifically, what are needed are new and improved solutions for monitoring such network traffic and providing for zero trust security for these mobile network environments.

Accordingly, various techniques for providing mobile network information sharing via eBPF for zero trust security are disclosed.

In some embodiments, a system, process, and/or computer program product for providing mobile network information sharing via eBPF for zero trust security includes monitoring network traffic in a core mobile network using an agent executed on a network element in the core mobile network to identify a session associated with a User Equipment (UE) that attached to the core mobile network for mobile network communications; extracting meta information associated with the session using the agent executed on a network element in the core mobile network; sending the extracted meta information to a security platform located outside of the core mobile network; and enforcing a security policy on the session at the security platform based on the extracted meta information to apply granular-based security in the core mobile network based on a security policy.

For example, the agent executed on the network element in the core mobile network can be implemented as an extended Berkeley Packet Filter (eBPF) agent that provides access to the network traffic at a kernel level of the network element prior to encryption of the network traffic and/or provides access to the network traffic at an interface (e.g., an SGi interface, N3 interface, N4 interface, N6 interface, and/or other interfaces) of the network element. In this example, the agent can send the extracted meta information to the security platform located outside of the core mobile network using an application programming interface (API) (e.g., to push a mapping of an IMSI-to-IP address associated with the session).

In one embodiment, a system, process, and/or computer program product for providing mobile network information sharing via eBPF for zero trust security includes blocking the session from accessing a resource based on the security policy.

In one embodiment, a system, process, and/or computer program product for providing mobile network information sharing via eBPF for zero trust security includes allowing the session to access a resource based on the security policy.

In one embodiment, a system, process, and/or computer program product for providing mobile network information sharing via eBPF for zero trust security includes providing granular-based security using mobile identifiers including subscriber-ID based security, wherein subscriber-ID based security includes using International Mobile Subscriber Identity (IMSI) in a 4G mobile network and/or using Subscription Permanent Identifier (SUPI) in a 5G mobile network.

In one embodiment, a system, process, and/or computer program product for providing mobile network information sharing via eBPF for zero trust security includes providing granular-based security using mobile identifiers including equipment-ID based security, wherein subscriber-ID based security includes using International Mobile Equipment Identity (IMEI) in a 4G mobile network and/or using Permanent Equipment Identifier (PEI) in a 5G mobile network.

In an example implementation, the disclosed techniques for providing mobile network information sharing via eBPF for zero trust security include using a software implemented sensor(s) (e.g., security sensors implemented as eBPF enabled sensors; and it is noted that eBPF is native in all Linux kernel versions 4.16 and later) leveraging eBPF to view mobile network activity (e.g., 5G network activity) to gain insight into certain meta data associated with the monitored mobile network activity (e.g., monitored sessions within the monitored 5G mobile network environment) and identities for Zero Trust networking. For instance, the disclosed eBPF enabled sensor would be able to determine the IMSI, IMEI, Network Slice ID, UUID, etc. of each subscriber attaching to the mobile network. The eBPF enabled sensor can then provide (e.g., in near real time) the extracted meta data for the session to a security platform (e.g., NGFW, such as via an API or a software data stream/pipeline, such as implemented using Apache Kafka, which is publicly available at https://kafka.apache.org/) for granular security policy enforcement (e.g., and can also facilitate greater insight into the monitored traffic and threats in the mobile network environment), such as will be further described below.

As such, by using eBPF, the disclosed eBPF enabled sensors can also facilitate native support in Linux kernels and the ability to intercept 5G network activity even if that traffic is encrypted within the monitored mobile network environment. Moreover, there is no need to request certificates (e.g., for Transport Layer Security (TLS) of a TLS encrypted session) to be loaded on the security platform for encrypted traffic visibility in the mobile network environment as the disclosed eBPF enabled sensors can capture that traffic at the kernel level prior to encryption, such as will be further described below.

The disclosed techniques for providing mobile network information sharing via eBPF for zero trust security can be used to facilitate granular-based security (e.g., and/or zero trust security) that includes security policy enforcement based on subscriber-ID based security (e.g., International Mobile Subscriber Identity (IMSI) in a 4G mobile network and/or using Subscription Permanent Identifier (SUPI) in a 5G mobile network), equipment-ID based security (e.g., International Mobile Equipment Identity (IMEI) in a 4G mobile network and/or using Permanent Equipment Identifier (PEI) in a 5G mobile network), and/or network slice-ID based security in the mobile network.

The disclosed techniques for mobile network information sharing via eBPF for zero trust security can be applied to perform level threat identification and prevention in the mobile network, perform application identification and control in the mobile network, and perform URL filtering in the mobile network.

Further, by using the disclosed eBPF enabled sensors, we also remove the reliance on loadable kernel modules, which reduces any real or perceived interference with higher level programs.

In addition, by using the disclosed eBPF enabled sensors, we can facilitate flexibility of 3GPP message capture even if the service provider of the mobile network does not expose interfaces of network entities within the service provider mobile network (e.g., some service providers do not allow for such 3GPP interface taps) for security scrutiny (e.g., by a security platform/sensor) as similarly discussed above. As such, the disclosed eBPF enabled sensors effectively allow for placing the network security controls in accepted areas of the mobile network environment, such as the Gi/N6 mobile interfaces in the service provider mobile network.

Moreover, the disclosed eBPF enabled sensors can unobtrusively view traffic on interfaces that are often closed within such mobile network environments as similarly discussed above. Also, port mirrors or network changes are needed to facilitate zero trust networking within such mobile network environments.

These and other embodiments and examples for providing mobile network information sharing via eBPF for zero trust security (e.g., including for applying granular-based and/or zero trust security in mobile networks using IMSI, IMEI, RAT type, Network Slice, DNN/APN, location, user IP, and/or other mobile network related information) in service provider mobile networks or other mobile networks will be further described below.

Example System Architectures for Mobile Network Information Sharing Via EBPF for Zero Trust Security Accordingly, in some embodiments, the disclosed techniques include providing a security platform (e.g., the security function(s)/platform(s) can be implemented using a firewall (FW)/Next Generation Firewall (NGFW), a network sensor acting on behalf of the firewall, or another (virtual) device/component that can implement security policies (e.g., zero trust security policies), such as PANOS executing on a virtual/physical NGFW solution commercially available from Palo Alto Networks, Inc. or another security platform/NFGW, including, for example, Palo Alto Networks' PA Series next generation firewalls, Palo Alto Networks' VM Series virtualized next generation firewalls, and CN Series container next generation firewalls, and/or other commercially available virtual-based or container-based firewalls can similarly be implemented and configured to perform the disclosed techniques) configured to provide DPI capabilities (e.g., including stateful inspection) of network traffic by providing mobile network information sharing via extended Berkeley Packet Filter (eBPF) for zero trust security as further described below.

FIG. 1 is a block diagram of an architecture of a 5G wireless network with a security platform for providing mobile network information sharing via extended Berkeley Packet Filter (eBPF) for zero trust security in accordance with some embodiments. Specifically, FIG. 1 is an example 5G mobile network environment that includes a Security Platform 102 (e.g., the security function(s)/platform(s) can be implemented using a firewall (FW)/Next Generation Firewall (NGFW), a network sensor acting on behalf of the firewall, or another (virtual) device/component that can implement security policies using the disclosed techniques, including, for example, Palo Alto Networks' PA Series next generation firewalls, Palo Alto Networks' VM Series virtualized next generation firewalls, and CN Series container next generation firewalls, and/or other commercially available virtual-based or container-based firewalls can similarly be implemented and configured to perform the disclosed techniques) for providing mobile network information sharing via eBPF for zero trust security over various interfaces (e.g., over various interfaces, such as SGi and/or other interfaces in a 4G/LTE core network, and N3 and/or N6 interfaces and/or other interfaces in a 5G core network as shown in FIG. 1) in mobile networks (e.g., 4G/LTE, 5G, and/or later mobile networks) as further described below.

As shown in FIG. 1, the 5G mobile network environment can also include 4G Radio Access Network (RAN) access and 5G Radio Access Network (RAN) access as shown at 106A and 106B, respectively, and/or other networks including, for example, Wi-Fi access and fixed access as shown at 108A and 108B, respectively, to facilitate data communications for subscribers (e.g., using User Equipment (UE), such as smart phones, laptops, computers (which may be in a fixed location), and/or other cellular enabled computing devices/equipment, such as endpoint devices as shown at 104, or other network communication enabled devices) including over a Public Service Network/Internet (e.g., the Internet) 120 to access various applications, web services, content hosts, etc. and/or other networks. Each of the above-described 5G network access mechanisms are in communication with a 5G Core Network 110 that includes a 5G Mobile Core User Plane Function (UPF) 112, an Access and Mobility Management Function (AMF) 114, and a Session Management Function (SMF) 116. 5G Mobile Core User Plane (UP) Function 112 is in communication with a Central Data Network 120 via an N6 interface in which Security Platform 102 is located inline between UPF 112 and Public Service Network/Internet 120. Security Platform 102 is also in communication with security sensors (e.g., eBPF sensors) 124A for AMF 114 and 124B for SMF 116 via a collector 126 (e.g., a data store) and a streaming pipeline component 128 (e.g., an Apache Kafka streamlining pipeline) as will be further described below.

Referring to FIG. 1, network traffic communications are monitored using Security Platform 102. As shown, network traffic communications are monitored/filtered in the 5G network using Security Platform 102 (e.g., (virtual) devices/appliances that each include a firewall (FW), a network sensor acting on behalf of the firewall, or another device/component that can implement security policies using the disclosed techniques) configured to perform the disclosed techniques for applying security, including zero trust security over various interfaces (e.g., N3, N6, and/or other interfaces in a 5G core network) in mobile networks as similarly described above and as further described below.

In some embodiments, a security platform is further configured to provide the following DPI capabilities: DPI of IP traffic over the N6 interface. In an example implementation, the security platform is configured to provide DPI capabilities (e.g., including to identify an APP ID, a user ID, a content ID, perform URL filtering, etc.) of, for example, IP sessions over N6 interfaces between UPF 112 and Public Service Network/Internet 120 to apply security on monitored user plane traffic based on a policy (e.g., layer-7 security, and/or various other fine grained and/or zero trust security policy enforcement) as further described below. For example, the disclosed eBPF security sensors 124A and 124B in communication with security platform 102 can be implemented to monitor UE sessions in 5G core mobile network 110 including over various protocols (e.g., HTTP2, PFCP and GTP) and various interfaces (e.g., N3 and N6 as shown in FIG. 1) to enforce a configured security policy at security platform 102 (e.g., based on stateful correlation between traffic on various interfaces and NFs, such as to extract various parameters and/or payloads associated with the monitored network traffic/user session traffic to identify malware, malicious URLs/domain names, and/or exploit attempts), such as will be further described below.

In addition, Security Platform 102 can also be in network communication with a Cloud Security Service 122 (e.g., a commercially available cloud-based security service, such as the WildFire™ cloud-based malware analysis environment that is a commercially available cloud security service provided by Palo Alto Networks, Inc., which includes automated security analysis of malware samples as well as security expert analysis, or a similar solution provided by another vendor can be utilized), such as via the Internet. For example, Cloud Security Service 122 can be utilized to provide the Security Platforms with dynamic prevention signatures for malware, DNS, URLs, CNC malware, and/or other malware as well as to receive malware samples for further security analysis.

Figure 2A:
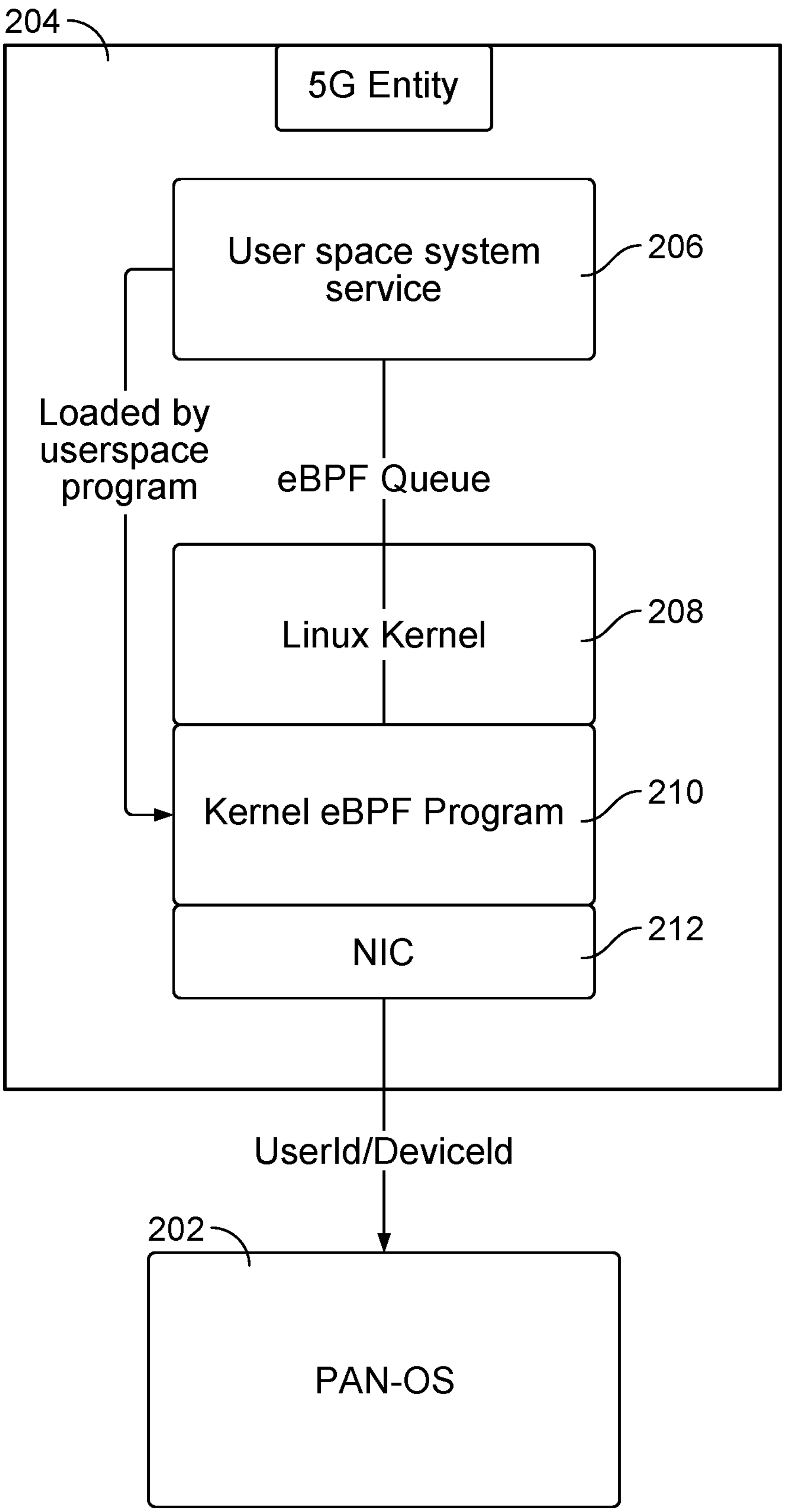
FIG. 2A illustrates a component architecture and a processing flow for an eBPF sensor deployed in a 5G core mobile network element in accordance with some embodiments.

FIG. 2A illustrates a component architecture and a processing flow for an eBPF sensor deployed in a 5G core mobile network element in accordance with some embodiments. In this example implementation, the eBPF agent (e.g., eBPF client/sensor, such as shown at 124A and 124B in FIG. 1) can be implemented using a lightweight microservice, such as shown in FIG. 2A as will now be described.

Referring to FIG. 2A, a 5G entity 204 (e.g., AMF 114, SMF 116, and/or another 5G entity) includes an implementation of the eBPF agent (e.g., eBPF client/sensor 124A or 124B as shown in FIG. 1). The eBPF client/sensor includes a user space module shown as a user space system service 206 and a kernel module shown as kernel eBPF program 210 that executes in a Linux kernel 208 of the 5G entity. In this example implementation, the eBPF client/sensor is configured to communicate with a security platform shown as PAN-OS 202 in FIG. 2A (e.g., a PAN-OS firewall that is commercially available from Palo Alto Networks, Inc., headquartered in Santa Clara, CA, which can similarly be used to provide NFGW 102 as shown in FIG. 1) over an interface to communicate various monitored/extracted information via a network interface card (NIC) 212 from the 5G entity to the security platform. For example, User-ID/Device-ID as shown in FIG. 2A (e.g., and/or other meta data) is extracted using the kernel eBPF program and is then communicated over the interface, which can be implemented, for example, using a REST/XML interface. In this example implementation, when user space system service 206 begins execution on the 5G entity, it checks for eBPF kernel module 210 and loads the most recent version onto the selected interfaces (e.g., N3, N4, N6, and/or other interfaces, which can be defined in a system service configuration file). The user space can have access to the kernel program through an eBPF map (e.g., implemented using either a queue or a stack) and can pop off entries added by the kernel program (210) and then send updates to the security platform (202).

In this example implementation, the eBPF kernel module (210) is loaded into the kernel (208) by the user space module (206). Specifically, the eBPF code of the eBPF kernel module (210) is loaded at the XDP entry point, and it monitors all traffic. For example, the eBPF kernel module (210) can check for control plane traffic and efficiently parse the control plane traffic to create a mapping between the user's IP address and their User-Id/Device-Id. In this example implementation, the mapping can be added to an eBPF hash map to detect changes (e.g., updates can then be communicated to user space (206)). When a change is detected, it will be pushed to an eBPF Queue Map and the user space program can pop it and communicate such updates to the security platform (102).

In this example implementation, the eBPF agent learns the Subscriber ID and Equipment ID associated with UEs (e.g., users) as they attach to the 5G core mobile network and leverage APIs on the security platform to push this meta data to the security platform. Specifically, the User-ID or other APIs can be used to push the mapping of IMSI-to-IP address to the security platform. For example, if a user attaches to the 5G core mobile network and receives an IP address of 10.01.02.03 from the 5G core mobile network, then the mapping of that IP address to its IMSI is automatically pushed from the eBPF agent to the security platform.

Further, in this example implementation, the eBPF agent is configured to inspect encrypted traffic and plaintext directly with a container-native agent co-residing in the cloud infrastructure where the encrypted traffic is generated and consumed, providing access to the following types of metadata: (1) encrypted session messaging via client/server hello exchanges; (2) encrypted session plaintext by providing plaintext prior to or post encryption processes; and (3) encrypted traffic for decryption and forensic inspection, such as using the security platform as described herein.

In this example implementation, as similarly described above with respect to FIG. 2A, the eBPF agent can be deployed as a kernel mode agent, for example on an N4 and/or an N6 device in the 5G core mobile network as will now be described. The eBPF module is loaded into the kernel by a user space module. The eBPF code is loaded at the XDP entry point. The eBPF agent can then be configured to monitor all network traffic. For example, the eBPF agent can check for control plane traffic and can parse that monitored traffic efficiently to create a mapping between the user's IP address and their various mobile attributes (e.g., IMSI and IMEI). The mapping can then be added to an eBPF hash map to detect changes (e.g., only updates will be communicated to user space in this example implementation). When a change is detected, the updated information can then be pushed to a queue (e.g., an eBPF Queue Map) and a user space program can be configured to access it and communicate that updated mapping information to the security platform (e.g., a security platform/NGFW, such as PAN-OS/Panorama for a commercially available security platform/NGFW from Palo Alto Networks, Inc., headquartered in Santa Clara, CA).

Below is an example implementation of the eBPF agent in C/C++ for accessing encrypted SSL traffic prior to the encryption.

```
// A probe on entry of SSL_write
UProbeSpec kSSLWriteEntryProbeSpec{
.obj_path = "/usr/lib/x86_64-linux-gnu/libssl.so.1.1",
.symbol = "SSL_write",
.attach_type = BPF_PROBE_ENTRY,
.probe_fn = "probe_entry_SSL_write",
};
// A probe on return of SSL_write
UProbeSpec kSSLWriteRetProbeSpec{
.obj_path = "/usr/lib/x86_64-linux-gnu/libssl.so.1.1",
.symbol = "SSL_write",
.attach_type = BPF_PROBE_RETURN,
.probe_fn = "probe_ret_SSL_write",
};
// A probe on entry of SSL_read
UProbeSpec kSSLReadEntryProbeSpec{
.obj_path = "/usr/lib/x86_64-linux-gnu/libssl.so.1.1",
.symbol = "SSL_read",
.attach_type = BPF_PROBE_ENTRY,
.probe_fn = "probe_entry_SSL_read",
};
// A probe on return of SSL_read
UProbeSpec kSSLReadRetProbeSpec{
.obj_path = "/usr/lib/x86_64-linux-gnu/libssl.so.1.1",
.symbol = "SSL_read",
.attach_type = BPF_PROBE_RETURN,
.probe_fn = "probe_ret_SSL_read",
};
```

As such, the security platform receives the IMSI for the user in all logs (e.g., firewall logs), including traffic, threat, URL, and Wildfire logs. Thus, if there is malicious traffic from this user or towards this user, then a Security Operations Center (SOC) can utilize more than just the IP address to address/resolve any such security risks. In addition, the security platform receives the subscriber information (e.g., Subscriber ID), and as such, the affected user/device can also be determined using the subscriber information.

Further, the visibility allows an enterprise (e.g., a network/security administrator (admin) for the enterprise) to enact security policies based on the IMSI, Subscriber IDs, and/or other extracted 5G parameters. As an example, if a certain set of users are allowed access to a resource, but another set is not, various security policies can be configured and enforced by the security platform based on the IMSI, Subscriber IDs, and/or other extracted 5G parameters to enforce the configured security posture (e.g., IP addresses of the device may change, but these configured security policies will remain effective).

FIG. 2B illustrates an example of a traffic log showing the extracted user's IMSI in the User-ID field in accordance with some embodiments.

FIG. 2C illustrates an example of a threat/URL log in accordance with some embodiments. Similarly, when threat traffic is observed, the Threat/URL log can also include the User-ID information. As shown in FIG. 2C, the user attempted to browse to a Command and Control server over HTTP, and the user's session/traffic is blocked, and because the User is shown in the log, the SOC, SOAR systems, etc. which receive these alerts can perform a timely responsive action.

FIG. 2D illustrates an example of a security policy in accordance with some embodiments. In this example, using the User-ID value, enterprises can create policies (e.g., security/NGFW policies) specific to the users and devices on their network. As shown in FIG. 2D, this example security policy is configured to allow modbus traffic for a pre-configured/specified IMSI.

Figure 2E:
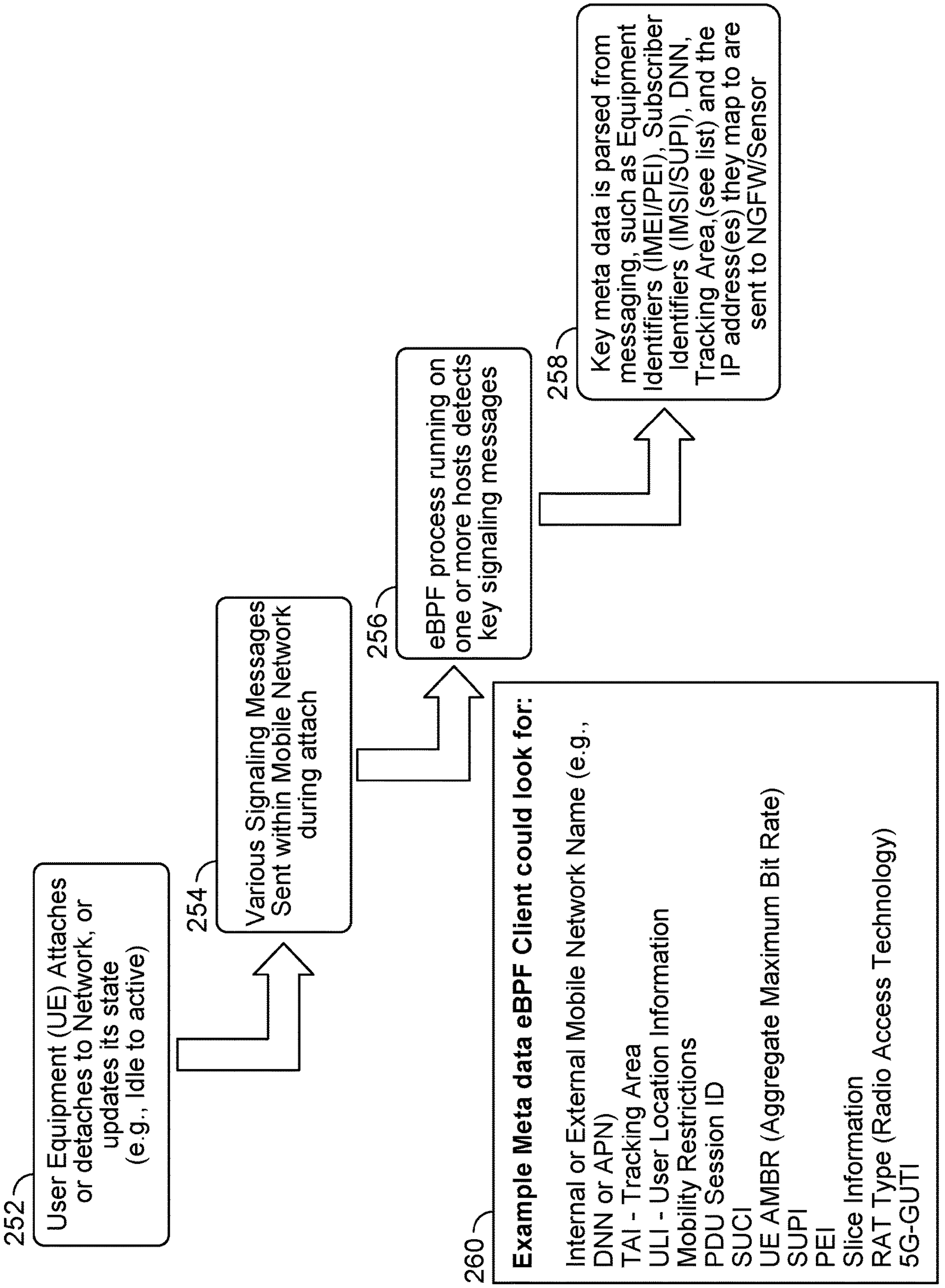
FIG. 2E illustrates a logical flow for using an eBPF sensor deployed in a 5G core mobile network element to extract meta data from monitored user plane traffic in accordance with some embodiments.

FIG. 2E illustrates a logical flow for using an eBPF sensor deployed in a 5G core mobile network element to extract meta data from monitored user plane traffic in accordance with some embodiments. As shown in FIG. 2E, at 252, a User Equipment (UE) attaches or detaches to the 5G mobile network, or updates its state (e.g., from idle to active). At 254, various signaling messages are sent within the 5G core mobile network during the attach operation. At 256, the eBPF sensor (e.g., eBPF client/sensor, such as shown at 124A and 124B in FIG. 1) process is running by one or more hosts (e.g., network elements, such as executed on AMF 114 and/or SMF 116 as shown in FIG. 1), and the eBPF sensor detects key signaling messages. At 258, various meta data (e.g., key meta, such as one or more of the example meta data that the eBPF client can extract as shown at 260 in FIG. 2E), such as Equipment Identifiers (IDs) (e.g., IMEI/PEI), Subscriber Identifiers (IDs) (e.g., IMSI/SUPI), DNN, Tracking Area Information (TAI) and/or User Location Information (ULI), and the IP address(es) that they map to are sent from the eBPF sensor to the security platform (e.g., security sensor/NFGW) for performing security policy enforcement (e.g., granular and/or zero trust security policy enforcement), such as similarly described above.

As will now be apparent to one of ordinary skill in the art, the disclosed techniques for providing mobile network information sharing via eBPF for zero trust security can be applied in a variety of additional example use case scenarios to detect/prevent these and other types of attacks for facilitating enhanced security for various deployments and environments in mobile networks.

Figure 3:
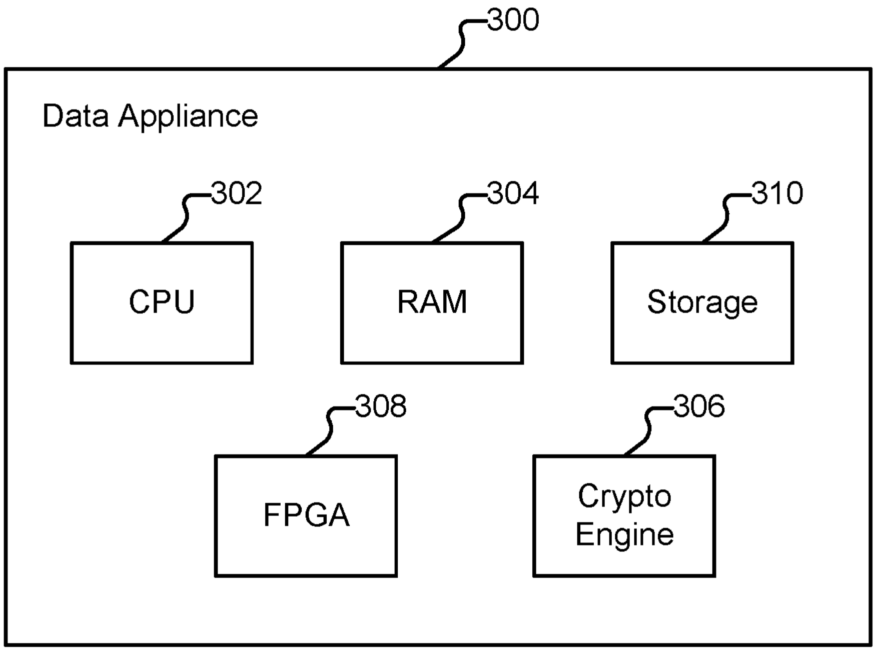
FIG. 3 is a functional diagram of hardware components of a network device for providing mobile network information sharing via eBPF for zero trust security in accordance with some embodiments.

Example Hardware Components of a Network Device for Mobile Network Information Sharing Via EBPF for Zero Trust Security FIG. 3 is a functional diagram of hardware components of a network device for providing mobile network information sharing via eBPF for zero trust security in accordance with some embodiments. The example shown is a representation of physical/hardware components that can be included in network device 300 (e.g., an appliance, gateway, or server that can implement the security platform disclosed herein). Specifically, network device 300 includes a high performance multi-core CPU 302 and RAM 304. Network device 300 also includes a storage 310 (e.g., one or more hard disks or solid state storage units), which can be used to store policy and other configuration information as well as signatures. In one embodiment, storage 310 stores certain information (e.g., subscriber-ID, equipment-ID, and/or network slice-ID along with user-ID and syslog messages related/extracted parameters) that is extracted from monitored traffic over various interfaces (e.g., SGi, N6, and/or other interfaces) that are monitored for implementing the disclosed security policy enforcement techniques for applying context-based security over various interfaces including the disclosed techniques for applying subscriber-ID based security, equipment-ID based security, and/or network slice-ID based security with user-ID and syslog messages in mobile networks using a security platform(s) as described herein. Network device 300 can also include one or more optional hardware accelerators. For example, network device 300 can include a cryptographic engine 306 configured to perform encryption and decryption operations, and one or more FPGAs 308 configured to perform signature matching, act as network processors, and/or perform other tasks.

Figure 4:
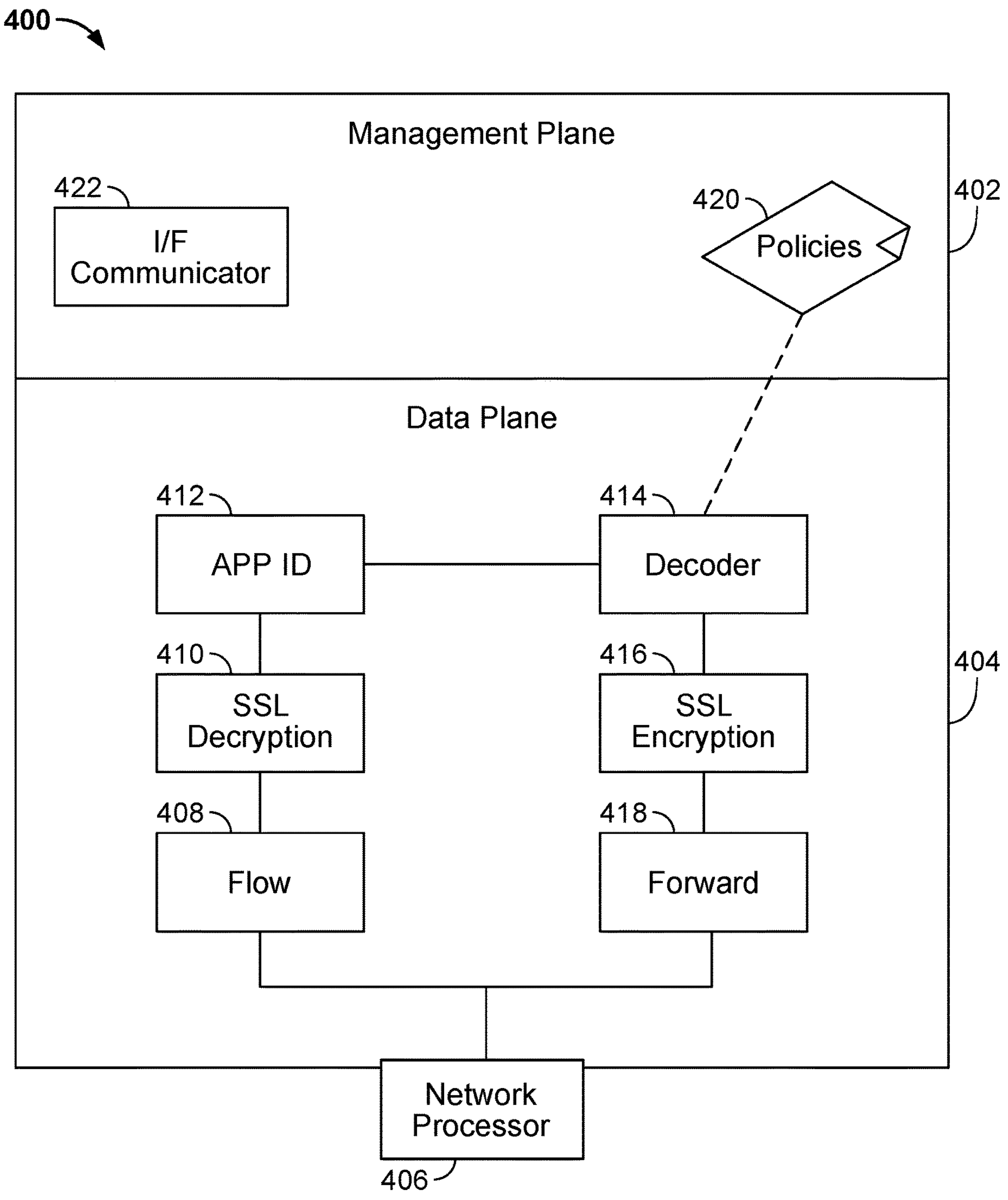
FIG. 4 is a functional diagram of logical components of a network device for providing mobile network information sharing via eBPF for zero trust security in accordance with some embodiments.

Example Logical Components of a Network Device for Mobile Network Information Sharing Via EBPF for Zero Trust Security FIG. 4 is a functional diagram of logical components of a network device for providing mobile network information sharing via eBPF for zero trust security in accordance with some embodiments. The example shown is a representation of logical components that can be included in network device 400 (e.g., a data appliance, which can implement the disclosed security function/platform and perform the disclosed techniques for applying subscriber-ID based security, equipment-ID based security, and/or network slice-ID based security with user-ID and syslog messages in mobile networks). As shown, network device 400 includes a management plane 402 and a data plane 404. In one embodiment, the management plane is responsible for managing user interactions, such as by providing a user interface for configuring policies and viewing log data. The data plane is responsible for managing data, such as by performing packet processing and session handling.

Suppose a mobile device attempts to access a resource (e.g., a remote web site/server, an MEC service, an IoT device, or another resource) using an encrypted session protocol, such as SSL. Network processor 406 is configured to monitor packets from the mobile device and provide the packets to data plane 404 for processing. Flow 408 identifies the packets as being part of a new session and creates a new session flow. Subsequent packets will be identified as belonging to the session based on a flow lookup. If applicable, SSL decryption is applied by SSL decryption engine 410 using various techniques as described herein. Otherwise, processing by SSL decryption engine 410 is omitted. Application identification (APP ID) module 412 is configured to determine what type of traffic the session involves (e.g., IP traffic and/or other network protocols of traffic, such as GTP-U traffic, between various monitored interfaces as similarly described above with respect to FIG. 1) and to identify a user associated with the traffic flow (e.g., to identify a user-ID and an application-ID (APP-ID) as described herein). For example, APP ID 412 can recognize a GET request in the received data and conclude that the session requires an HTTP decoder 414. As another example, APP ID 412 can recognize GTP-U session messages carrying encapsulated IP traffic from UEs (e.g., over various interfaces, such as similarly described above with respect to FIG. 1) and conclude that the session requires a GTP-U decoder (e.g., to extract information exchanged in the GTP-U traffic session over various interfaces including various parameters, such as similarly described above with respect to FIG. 1). For each type of protocol, there exists a corresponding decoder 414. In one embodiment, the application identification is performed by an application identification module (e.g., APP ID component/engine), and a user identification is performed by another component/engine. Based on the determination made by APP ID 412, the packets are sent to an appropriate decoder 414. Decoder 414 is configured to assemble packets (e.g., which may be received out of order) into the correct order, perform tokenization, and extract out information (e.g., such to extract various information exchanged in GTP-U traffic over various interfaces as similarly described above and further described below). Decoder 414 also performs signature matching to determine what should happen to the packet. SSL encryption engine 416 performs SSL encryption using various techniques as described herein and the packets are then forwarded using a forward component 418 as shown. As also shown, policies 420 are received and stored in the management plane 402. In one embodiment, policy enforcement (e.g., policies can include one or more rules, which can be specified using domain and/or host/server names, and rules can apply one or more signatures or other matching criteria or heuristics, such as for security policy enforcement for subscriber/IP flows on service provider networks based on various extracted parameters/information from monitored GTP-U/IP traffic and/or DPI of monitored GTP-U/IP and/or other protocol(s) traffic, such as SGi/N6/other interfaces as similarly described above with respect to FIG. 1) is applied as described herein with respect to various embodiments based on the monitored, decrypted, identified, and decoded session traffic flows.

As also shown in FIG. 4, an interface (I/F) communicator 422 is also provided for security platform manager communications. In some cases, network communications of other network elements on the service provider network are monitored using network device 400, and data plane 404 supports decoding of such communications (e.g., network device 400, including I/F communicator 422 and decoder 414, can be configured to monitor and/or communicate on, for example, reference point interfaces such as SGi, N6, and/or other interfaces where wired and wireless network traffic flow exists). As such, network device 400 including I/F communicator 422 can be used to implement the disclosed techniques for applying context-based security in mobile networks using an API and a data store as described above and as will be further described below.

Additional example use cases for the disclosed techniques for providing mobile network information sharing via eBPF for zero trust security will now be described.

Example Use Cases for Mobile Network Information Sharing Via EBPF for Zero Trust Security Additional example use cases for the disclosed techniques for providing mobile network information sharing via eBPF for zero trust security are described below.

Security Per PEI Policies

As a first example use case, suppose a UE attaches to a network, the disclosed eBPF enabled sensor can determine the following example key meta data for the monitored session for the UE within a secured mobile network environment (e.g., a service provider 5G mobile network): (1) Tracking Area Identity (TAI); (2) User Location Information (ULI); (3) Mobility Restrictions; (4) PDU Session ID; (5) SUCI; (6) UE AMBR (Aggregate Maximum Bit Rate); (7) SUPI; (8) PEI; (9) Network Slice Information; (10) Radio Access Technology (RAT) Type; and/or (11) 5G-GUTI.

In this first example use case, this extracted meta data/information, or a subset thereof, can be shared with the security platform for granular security policy information using this extracted meta data associated with the monitored session(s) (e.g., in this example, the security platform is configured with one or more policies based on or including PEI related parameters).

Security Per RAT Type Application Filtering

As a second example use case, suppose a UE attaches to a network, the disclosed eBPF enabled sensor can determine the following example key meta data for the monitored session for the UE within a secured mobile network environment (e.g., a service provider 5G mobile network): (1) Tracking Area Identity (TAI); (2) User Location Information (ULI); (3) Mobility Restrictions; (4) PDU Session ID; (5) SUCI; (6) UE AMBR (Aggregate Maximum Bit Rate); (7) SUPI; (8) PEI; (9) Network Slice Information; (10) Radio Access Technology (RAT) Type; (11) 5G-GUTI.

In this second example use case, this extracted meta data/information, or a subset thereof, can be shared with the security platform for granular security policy information using this extracted meta data associated with the monitored session(s) (e.g., in this example, the security platform is configured with one or more policies that prevent streaming media for the observed RAT Type, and, as such, this traffic can be, for example, blocked).

Security Based on Location

As a third example use case, suppose a UE attaches to a network, the disclosed eBPF enabled sensor can determine the following example key meta data for the monitored session for the UE within a secured mobile network environment (e.g., a service provider 5G mobile network), which in this example use case, at least includes the User Location Information.

In this third example use case, this extracted meta data/information associated with the location for the monitored UE/session can be shared with the security platform for granular security policy information so that the security platform can associate an IP address for the monitored session(s) for the UE and its associated IP address with a certain location (e.g., in this example, the security platform is configured with one or more policies that prevent access to certain resources based on the location of the session/UE requesting access to such protected resources, e.g., source code for an enterprise can be configured to not be accessible when a user is outside the country, such as outside the United States or another country).

Additional example processes for the disclosed techniques for providing mobile network information sharing via eBPF for zero trust security will now be described.

Figure 5:
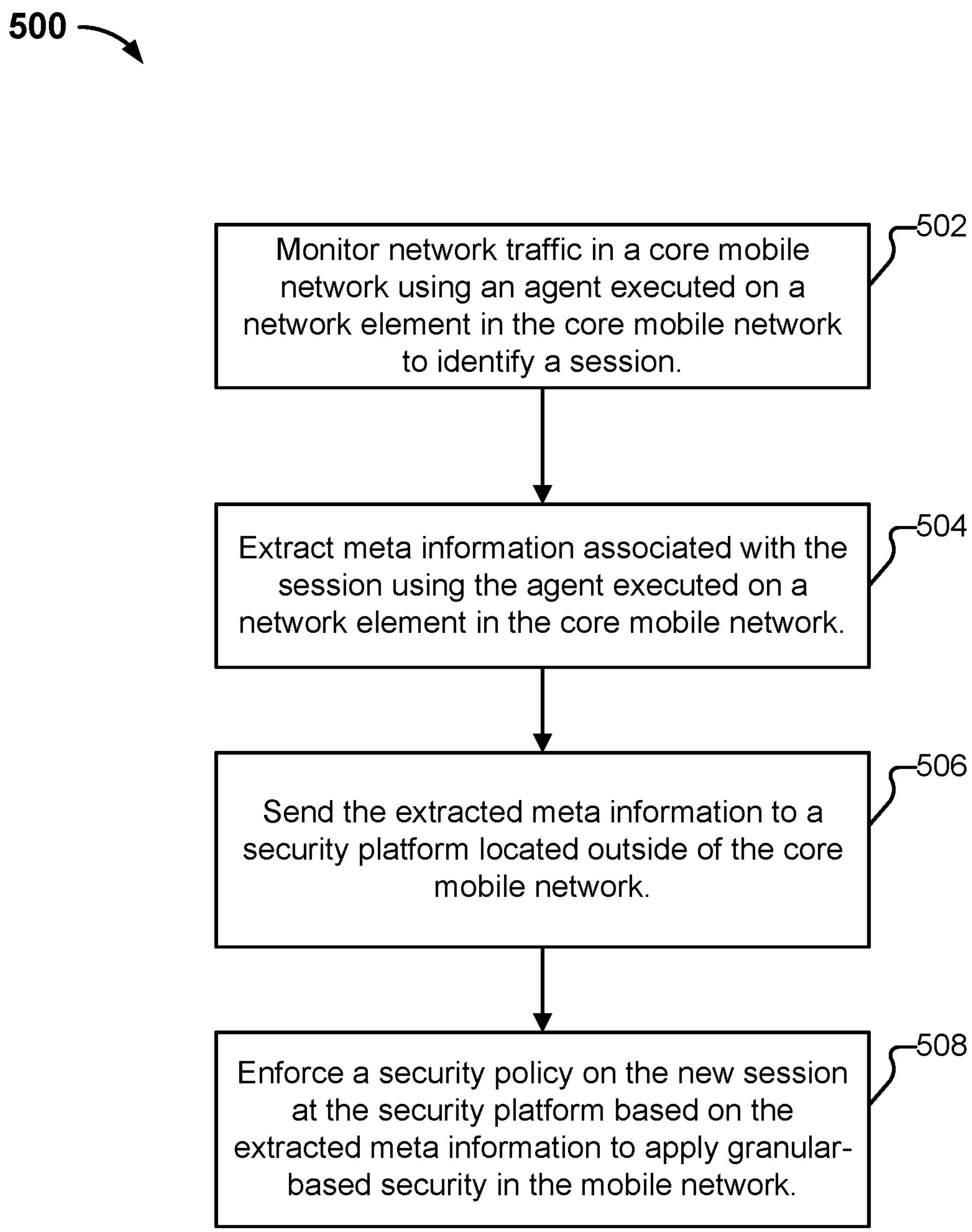
FIG. 5 is a flow diagram of a process for providing mobile network information sharing via eBPF for zero trust security in accordance with some embodiments.

Example Processes for Mobile Network Information Sharing Via EBPF for Zero Trust Security FIG. 5 is a flow diagram of a process for providing mobile network information sharing via eBPF for zero trust security in accordance with some embodiments. In some embodiments, a process 500 as shown in FIG. 5 is performed by the security platform and techniques as similarly described above including the embodiments described above with respect to FIGS. 1-4. In one embodiment, process 500 is performed by data appliance 300 as described above with respect to FIG. 3, network device 400 as described above with respect to FIG. 4, a virtual appliance (e.g., Palo Alto Networks' VM Series virtualized next generation firewalls, CN Series container next generation firewalls, and/or other commercially available virtual-based or container-based firewalls can similarly be implemented and configured to perform the disclosed techniques), an SDN security solution, a cloud security service, and/or combinations or hybrid implementations of the aforementioned as described herein.

At 502, monitoring network traffic in a core mobile network using an agent executed on a network element in the core mobile network to identify a session (e.g., a new session) associated with a User Equipment (UE) that attached to the core mobile network for mobile network communications is performed. For example, the agent executed on the network element in the core mobile network can be implemented using an extended Berkeley Packet Filter (eBPF) agent, such as similarly described above with respect to FIGS. 1-2E.

At 504, extracting meta information associated with the session using the agent executed on a network element in the core mobile network is performed. For example, the agent executed on the network element in the core mobile network can be configured to extract various meta information (e.g., meta data), such as similarly described above with respect to FIGS. 1-2E.

At 506, the extracted meta information is sent (e.g., from the agent) to a security platform located outside of the core mobile network. For example, a streaming pipeline (e.g., using an Apache Kafka streaming pipeline) can be used for sending the extracted meta information to the security platform, such as similarly described above with respect to FIGS. 1-2E.

At 508, enforcing a security policy on the session at the security platform based on the extracted meta information (e.g., meta data) to apply granular-based security in the core mobile network based on a security policy is performed. For example, security policy enforcement can include allowing or blocking the session (e.g., and/or other actions can be performed based on the security policy), such as similarly described above with respect to FIGS. 1-2E.

Figure 6:
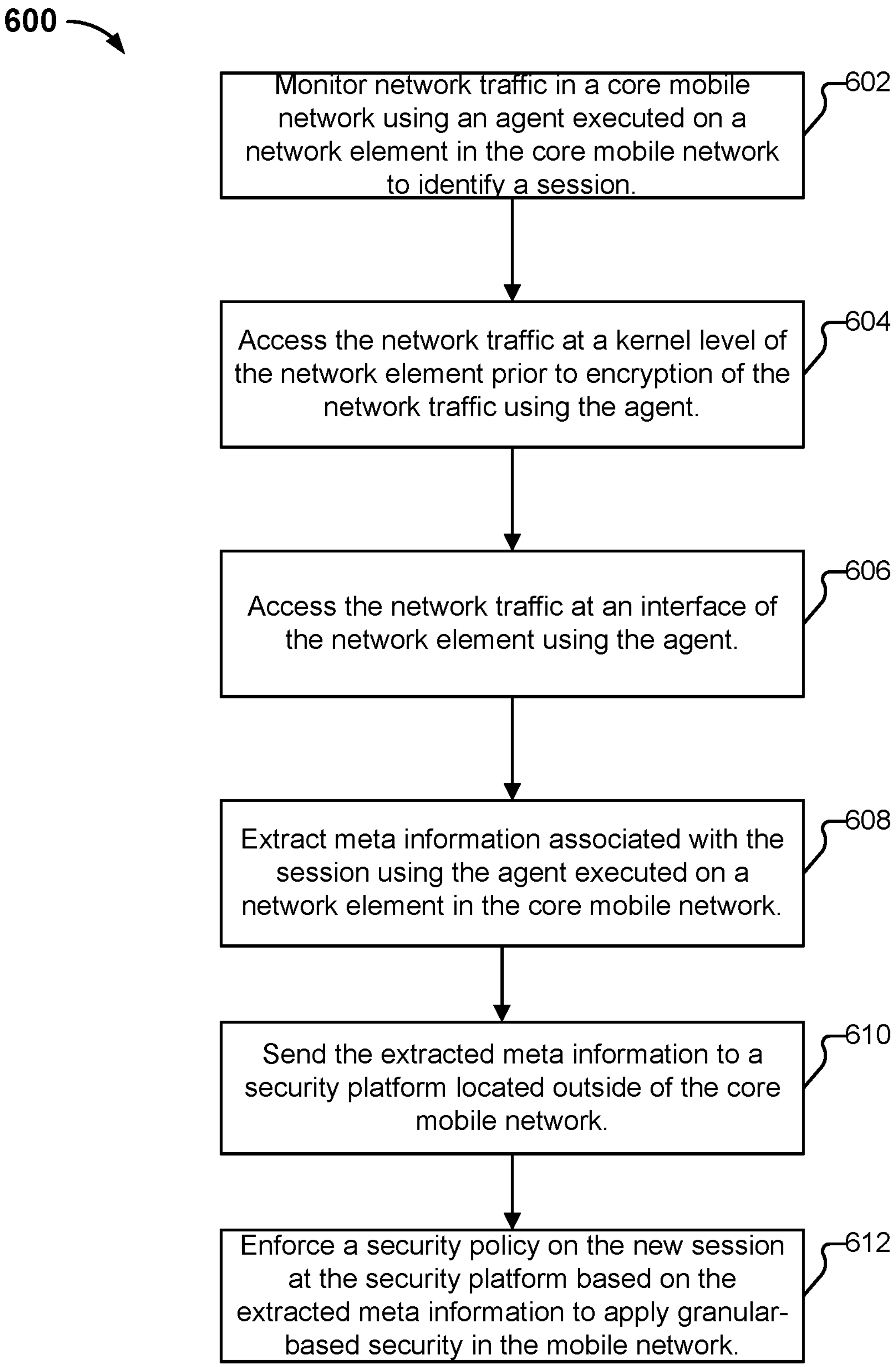
FIG. 6 is another flow diagram of a process for providing mobile network information sharing via eBPF for zero trust security in accordance with some embodiments.

FIG. 6 is another flow diagram of a process for providing mobile network information sharing via eBPF for zero trust security in accordance with some embodiments. In some embodiments, a process 600 as shown in FIG. 6 is performed by the security platform and techniques as similarly described above including the embodiments described above with respect to FIGS. 1-4. In one embodiment, process 600 is performed by data appliance 300 as described above with respect to FIG. 3, network device 400 as described above with respect to FIG. 4, a virtual appliance (e.g., Palo Alto Networks' VM Series virtualized next generation firewalls, CN Series container next generation firewalls, and/or other commercially available virtual-based or container-based firewalls can similarly be implemented and configured to perform the disclosed techniques), an SDN security solution, a cloud security service, and/or combinations or hybrid implementations of the aforementioned as described herein.

At 602, monitoring network traffic in a core mobile network using an agent executed on a network element in the core mobile network to identify a session (e.g., a new session) associated with a User Equipment (UE) that attached to the core mobile network for mobile network communications is performed. For example, the agent executed on the network element in the core mobile network can be implemented using an extended Berkeley Packet Filter (eBPF) agent, such as similarly described above with respect to FIGS. 1-2E.

At 604, accessing the network traffic at a kernel level of the network element prior to encryption of the network traffic is performed using the agent executed on the network element in the core mobile network. For example, the agent executed on the network element in the core mobile network can be implemented as an extended Berkeley Packet Filter (eBPF) agent that provides access to the network traffic at a kernel level of the network element prior to encryption of the network traffic, such as similarly described above with respect to FIGS. 1-2E.

At 606, accessing the network traffic at an interface of the network element is performed. For example, the agent executed on the network element in the core mobile network can be implemented as an extended Berkeley Packet Filter (eBPF) agent that facilitates access to various monitored interfaces and protocols, such as GTP-U over various interfaces (e.g., over SGi, N3, N4, N6, and/or other interfaces) and/or other protocols, in the core mobile network, such as the SGi and N6 interfaces, as similarly described above with respect to FIGS. 1-2E.

At 608, extracting meta information associated with the session using the agent executed on a network element in the core mobile network; sending the extracted meta information to a security platform located outside of the core mobile network is performed. For example, the agent executed on the network element in the core mobile network can be configured to extract various meta information (e.g., meta data), such as similarly described above with respect to FIGS. 1-2E.

At 610, the extracted meta information is sent (e.g., from the agent) to a security platform located outside of the core mobile network. For example, a streaming pipeline (e.g., using an Apache Kafka streaming pipeline) can be used for sending the extracted meta information to the security platform, such as similarly described above with respect to FIGS. 1-2E.

At 612, enforcing a security policy on the session at the security platform based on the extracted meta information (e.g., meta data) to apply granular-based security in the core mobile network based on a security policy is performed. For example, security policy enforcement can include allowing or blocking the session (e.g., and/or other actions can be performed based on the security policy), such as similarly described above with respect to FIGS. 1-2E.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:

a processor configured to:

monitor network traffic in a core mobile network using an agent executed on a network element in the core mobile network to identify a session associated with a User Equipment (UE) that attached to the core mobile network for mobile network communications;

extract meta information associated with the session using the agent executed on the network element in the core mobile network, wherein the meta information includes subscriber information, equipment information, network slice information, and other meta data, wherein the subscriber information includes subscriber-ID, wherein the equipment information includes equipment-ID, wherein the network slice information includes network slice-ID, and wherein the other meta data includes two or more of the following: Radio Access Technology (RAT) Type, Access Point Name (APN), Data Network Name (DNN), Tracking Area Information (TAI), user-ID, a syslog message, Mobility Restrictions, Protocol Data Unit (PDU) Session ID, Subscription Concealed Identifier (SUCI), UE (Aggregate Maximum Bit Rate) AMBR, Subscription Permanent Identifier (SUPI), and/or Globally Unique Temporary Identity (GUTI); and send the extracted meta information to a security platform located outside of the core mobile network, wherein the security platform is configured to:

enforce a security policy on the session at the security platform based on the extracted meta information to apply granular security in the core mobile network based on the security policy; and a memory coupled to the processor and configured to provide the processor with instructions.

2. The system recited in claim 1, wherein the agent executed on the network element in the core mobile network comprises an extended Berkeley Packet Filter (eBPF) agent.

3. The system recited in claim 1, wherein the agent executed on the network element in the core mobile network comprises an extended Berkeley Packet Filter (eBPF) agent that provides access to the network traffic at a kernel level of the network element prior to encryption of the network traffic.

4. The system recited in claim 1, wherein the agent executed on the network element in the core mobile network comprises an extended Berkeley Packet Filter (eBPF) agent that provides access to the network traffic at an interface of the network element.

5. The system recited in claim 1, wherein the agent sends the extracted meta information to the security platform located outside of the core mobile network using an application programming interface (API) to push a mapping of a mobile identifier-to-IP address associated with the session.

6. The system recited in claim 1, wherein the security platform is configured with a plurality of security policies to apply subscriber-ID based security, equipment-ID based security, and/or network slice-ID based security in the core mobile network.

7. The system recited in claim 1, wherein the security platform is configured with a plurality of security policies to apply zero trust security using subscriber-ID based security, equipment-ID based security, and/or network slice-ID based security in the core mobile network that includes a 5G mobile network.

8. The system recited in claim 1, wherein the processor is further configured to:

perform threat level identification and prevention in the core mobile network.

9. The system recited in claim 1, wherein the processor is further configured to:

perform application identification and control in the core mobile network.

10. The system recited in claim 1, wherein the processor is further configured to:

perform URL filtering in the core mobile network.

11. The system recited in claim 1, wherein the processor is further configured to:

block the session from accessing a resource based on the security policy.

12. The system recited in claim 1, wherein the processor is further configured to:

allow the session to access a resource based on the security policy.

13. A method, comprising:

monitoring network traffic in a core mobile network using an agent executed on a network element in the core mobile network to identify a session associated with a User Equipment (UE) that attached to the core mobile network for mobile network communications;

extracting meta information associated with the session using the agent executed on the network element in the core mobile network, wherein the meta information includes subscriber information, equipment information, network slice information, and other meta data, wherein the subscriber information includes subscriber-ID, wherein the equipment information includes equipment-ID, wherein the network slice information includes network slice-ID, and wherein the other meta data includes two or more of the following: Radio Access Technology (RAT) Type, Access Point Name (APN), Data Network Name (DNN), Tracking Area Information (TAI), user-ID, a syslog message, Mobility Restrictions, Protocol Data Unit (PDU) Session ID, Subscription Concealed Identifier (SUCI), UE (Aggregate Maximum Bit Rate) AMBR, Subscription Permanent Identifier (SUPI), and/or Globally Unique Temporary Identity (GUTI); and sending the extracted meta information to a security platform located outside of the core mobile network, wherein the security platform is configured to:

enforce a security policy on the session at the security platform based on the extracted meta information to apply granular security in the core mobile network based on the security policy.

14. The method of claim 13, wherein the agent executed on the network element in the core mobile network comprises an extended Berkeley Packet Filter (eBPF) agent.

15. The method of claim 13, wherein the agent executed on the network element in the core mobile network comprises an extended Berkeley Packet Filter (eBPF) agent that provides access to the network traffic at a kernel level of the network element prior to encryption of the network traffic.

16. The method of claim 13, wherein the agent executed on the network element in the core mobile network comprises an extended Berkeley Packet Filter (eBPF) agent that provides access to the network traffic at an interface of the network element.

17. A computer program product, the computer program product being embodied in a non-transitory computer readable storage medium and comprising computer instructions for:

monitoring network traffic in a core mobile network using an agent executed on a network element in the core mobile network to identify a session associated with a User Equipment (UE) that attached to the core mobile network for mobile network communications;

extracting meta information associated with the session using the agent executed on the network element in the core mobile network, wherein the meta information includes subscriber information, equipment information, network slice information, and other meta data, wherein the subscriber information includes subscriber-ID, wherein the equipment information includes equipment-ID, wherein the network slice information includes network slice-ID, and wherein the other meta data includes two or more of the following: Radio Access Technology (RAT) Type, Access Point Name (APN), Data Network Name (DNN), Tracking Area Information (TAI), user-ID, a syslog message, Mobility Restrictions, Protocol Data Unit (PDU) Session ID, Subscription Concealed Identifier (SUCI), UE (Aggregate Maximum Bit Rate) AMBR, Subscription Permanent Identifier (SUPI), and/or Globally Unique Temporary Identity (GUTI); and sending the extracted meta information to a security platform located outside of the core mobile network, wherein the security platform is configured to:

enforce a security policy on the session at the security platform based on the extracted meta information to apply granular security in the core mobile network based on the security policy.

* * * * *